Jan. 6, 1931. C. D. FINK 1,788,092

HOG FEEDER

Filed April 7, 1928

Charles D. Fink
Inventor

By C. A. Snow & Co.
Attorneys.

Patented Jan. 6, 1931

1,788,092

UNITED STATES PATENT OFFICE

CHARLES D. FINK, OF FINDLAY, OHIO

HOG FEEDER

Application filed April 7, 1928. Serial No. 268,261.

This invention relates to hog feeders and is more especially an improvement upon the structure disclosed in Patent No. 1,333,800 issued to me on March 16, 1920.

It is an object of the invention to provide improved means whereby the contents of the feeder can be agitated by the stock so that, after the feed trough has been emptied or practically emptied, the agitator will be actuated by the stock rooting in the trough and this agitation will result in the delivery of a further supply of feed to the trough.

Another object is to provide an agitator which can be operated by a door forming one of the walls of the trough, said door being adapted to be opened by the stock and at the same time operate the agitator.

Another object is to provide an agitator which is adjustably mounted.

With the foregoing and other objects in view which will appear as the description proceeds the invention resides in the combination and arrangement of parts and in the details of construction hereinafter described and claimed it being understood that changes in the precise embodiment of the invention herein disclosed may be made within the scope of what is claimed without departing from the spirit of the invention.

In the accompanying drawings the preferred form of the invention has been shown.

In said drawings.

Figure 1:
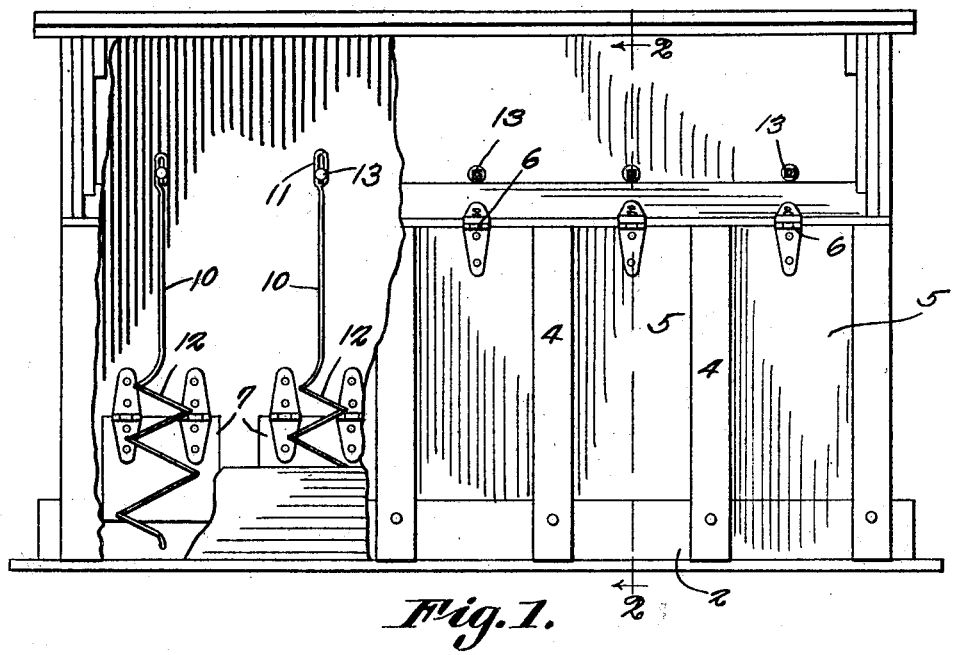
Figure 1 is a view partly in elevation and partly in section of a hog feeder embodying the present improvement.
Figure 2:
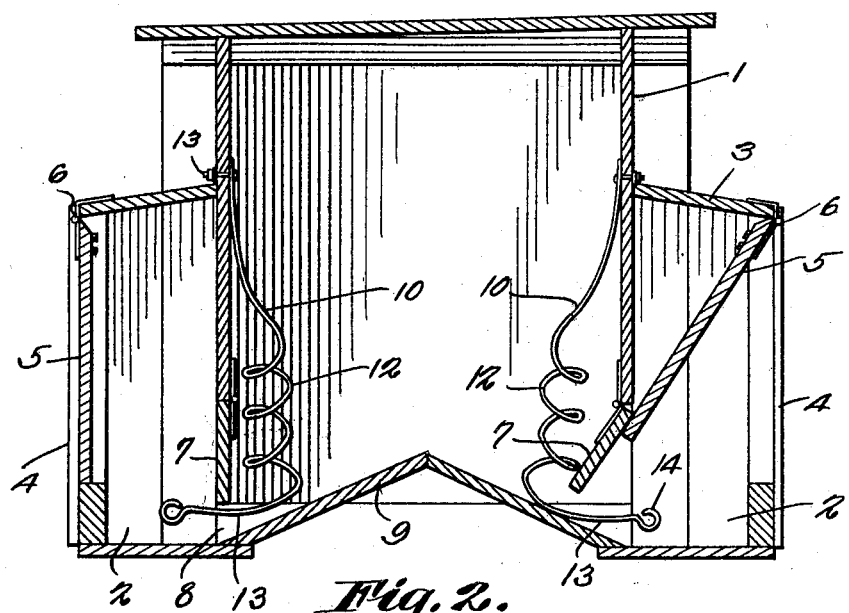
Figure 2 is a section on line 2—2, Figure 1, one of the doors being closed while the doors at the opposite sides of the structure are shown in their open positions.

Referring to the figures by characters of reference 1 designates a housing for holding feed and along each side of this housing, in the structure illustrated, is a feed trough 2 having a top 3 and divided at the front thereof with spaced strips 4 connecting the top and bottom of the trough and dividing the front into separate door openings. A door 5 is hingedly mounted at its upper end in each of these openings as shown at 6 and each door is adapted to swing inwardly when pressed against by the live stock. The back or inner wall of each trough has a hinged door 7 for each door 5, each of the doors 7 being adapted to swing inwardly and upwardly when pressed against. The doors 7 do not extend down to the bottoms of the trough but are normally spaced therefrom to provide outlet openings 8. The bottom of the feed housing 1 is inclined downwardly toward these openings as shown at 9.

Arranged within the housing 1 are opposed series of agitators. Each of these agitators 10 consists of a single length of strong stiff wire or the like bent at one end to form an elongated loop 11. The wire is extended downwardly from this loop and merges into a coil 12 the free end of which forms a finger 13 which extends outwardly under the adjacent door 7 and has an eye 14 or the like at the end thereof. One of these agitators is provided behind each of the doors 7 as shown in Figure 1 and when the doors 7 are closed the fingers 13 extend outwardly thereunder into the bottom portion of the trough 2.

In use the live stock will push against the doors 5 which, when swung inwardly, will expose the contents of the trough. This will allow the fingers 13 to be agitated by the stock rooting in the trough and as the fingers are agitated the agitators will be shifted within the housing 1 and loosen some of the feed so that it will gravitate through the openings 8 into the trough. Should the supply thus furnished not be ample, further pressure by the stock against the door 5 will cause it to come against the adjacent door 7 and thrust it inwardly against the agitator with the result that greater agitation of the contents of the housing will be set up and if the feed has become clogged, it will, by this operation, be loosened and caused to flow into the trough.

By loosening the bolts 13 which extend through the loops 11, the agitators can be adjusted upwardly or downwardly so as to render them more or less sensitive to the action of the stock being fed. In other words, by elevating each agitator the finger 13 will be raised where it can be more readily reached and actuated by the stock than where the finger is in its lowermost position.

Importance is attached to the fact that the agitating elements are formed of coiled wire. As a result of this arrangement each agitating device acts upon a greater area than would be possible should it be formed of a straight rod or the like. Not only will the coil dig into the bulk material over a wider path but also at superposed points, thus acting to break up the material, as will be obvious.

It is to be understood that various changes can be made in the construction of the housing and while the device illustrated shows two troughs arranged at opposite sides respectively of the housing it is to be understood that a single trough can be used if desired.

What is claimed is:

A feeder including a housing, a trough in communication therewith, an outer door suspended at the outer side of the trough, an inner door suspended at the inner side of the trough, said outer door being adapted to swing inwardly against the inner door to force the inner door backwardly into the housing, a resilient agitator suspended within the housing and having superposed convolutions, and a finger extending from the lower convolution under the inner door into the lower portion of the trough, said inner door constituting means, when swung inwardly, for engaging one of the convolutions to shift the agitator.

In testimony that I claim the foregoing as my own, I have hereto affixed my signature.

CHARLES D. FINK.